(12) United States Patent
Choi (10) Patent No.: US 7,494,430 B2
(45) Date of Patent: Feb. 24, 2009

(54) SYSTEM AND METHOD FOR CORRECTING GOLF SWING USING INTERNET

(76) Inventor: Seung-Whan Choi, 120-1103 Lotte Apartment, Nae-dong, Seo-gu, Daejeon 302-761 (KR)

( * ) Notice: Subject to any disclaimer, the term of this patent is extended or adjusted under 35 U.S.C. 154(b) by 695 days.

(21) Appl. No.: 10/522,391

(22) PCT Filed: Mar. 18, 2003

(86) PCT No.: PCT/KR03/00521

§ 371 (c)(1),
(2), (4) Date: Jan. 25, 2005

(87) PCT Pub. No.: WO2004/012129

PCT Pub. Date: Feb. 5, 2004

(65) Prior Publication Data

US 2006/0040755 A1    Feb. 23, 2006

(30) Foreign Application Priority Data

Jul. 29, 2002    (KR) .................. 10-2002-0044577

(51) Int. Cl.
*A63B 57/00*    (2006.01)
(52) U.S. Cl. .................. 473/407; 473/150; 473/218; 473/266; 473/269; 473/270; 473/409
(58) Field of Classification Search ................. 473/131, 473/150, 218, 266, 269, 270, 407, 409
See application file for complete search history.

(56) References Cited

U.S. PATENT DOCUMENTS

| 5,348,304 A | 9/1994 | Meade |
| 5,464,220 A | 11/1995 | Hansen |

FOREIGN PATENT DOCUMENTS

| JP | 6-114139 A | 4/1994 |
| KR | 99-13213 A | 2/1999 |
| KR | 2002-23720 A | 3/2002 |

OTHER PUBLICATIONS

International Search Report, dated Jul. 19, 2003, as part of PCT application No. PCT/KR03/00521.

*Primary Examiner*—Scott E Jones
(74) *Attorney, Agent, or Firm*—Graybeal Jackson LLP (57) ABSTRACT

The present invention relates to a system and method for correcting a golf swing using the Internet, which allows a golf to correct his golf swing through the use of the Internet, thus improving the golfing ability of the golfer. The system of the present invention includes photographing means, image processing means, weight center detecting means, club head detecting means, signal processing means, control means, display means, practice center communication means, personal communication means, a Web server, a three-dimensional data generating server, a golf swing managing server, and a mail server. The system of the present invention can provide moving pictures of golf swing practice and golf swing correcting data via the Internet, so a user's golf swing can be easily corrected at a golf practice center, home or office.

8 Claims, 6 Drawing Sheets

SYSTEM AND METHOD FOR CORRECTING GOLF SWING USING INTERNET

CROSS-REFERENCE TO RELATED APPLICATION

This application claims priority from PCT/KR2003/000521 (corresponding International Publication Number WO 2004/012129) filed on 18 Mar. 2003, and Korean Patent Application, 10-2002-0044577 filed on 29 Jul. 2002, which are incorporated herein by reference.

TECHNICAL FIELD

The present invention relates generally to a system and method for correcting a golf swing using the Internet, and more particularly to a system and method for correcting a golf swing using the Internet, which allows a golfer to correct his golf swing through the use of the Internet, thus improving the golfing ability of the golfer.

BACKGROUND ART

In general, a golf swing aims to hit a golf ball a desired distance in a desired direction by swing a golf club along a certain path. In order to correctly perform the golf swing, it is important to correctly perform a series of actions (back-swing, down-swing, impact and finish) for the golf swing.

Further, a golf swing requires various factors in success, such as the angle, trace, time and tempo of swing and the movement of a center of weight associated with swing. Golf swing practice aims to make a golfer adept in handing such factors to improve the golf swing of a golfer.

However, most of first prior art golf swing correcting systems employ a scheme in which a golf swing of a golfer is photographed at one location, and photographed images are analyzed at another location after stopping practice.

In this scheme, there is repeated a process in which a trainer points out the problems of a golf swing to a golfer using photographed images, and the golfer returns to a practice range and corrects his golf swing. This scheme is disadvantageous in that a golfer cannot find golf swing posture suitable for him by himself and must follow golf swing posture on which a trainer instructs the golfer.

Additionally, the first prior art golf swing correcting systems are disadvantageous in that a golfer cannot learn problems of his golf swing unless a professional trainer points out the problems, since a golfer cannot view his own swing while practicing his golf swing.

Accordingly, in order to overcome the problems of a first prior art golf swing correcting system, there is proposed a second prior art golf swing correcting system, which includes a camera for capturing a posture of a golfer, a sensor for detecting the movement of a center of weight of the golfer during a golf swing, a sensor for detecting the angle and speed of a golf club passing through an impact zone, and a monitor for displaying golf swing posture and various data, so a golf swing correcting system detects the angle and timing of a golf swing and the movement of a center of weight, thus allowing a golfer to correct his golf swing.

That is, a golfer detects the movement of a center of his weight, the angle and speed of his golf club and his golf swing posture, and corrects his golf swing posture using the monitor.

However, the second prior art golf swing correcting system is disadvantageous in that the golfer cannot correct his golf swing posture at a place other than his golf practice center, such as his home, office and other golf practice centers because the prior art golf swing correcting system can only be used by members at a certain golf practice center.

DISCLOSURE OF THE INVENTION

Accordingly, the present invention has been made keeping in mind the above problems occurring in the prior art, and an object of the present invention is to provide a system and method for correcting a golf swing using the Internet, which can provide moving pictures of golf swing practice and golf swing correcting data via the Internet, so a user's golf swing can be easily corrected at a golf practice center, home or office.

In order to accomplish the above object, the present invention provides A system for correcting a golf swing using the Internet, comprising photographing means for photographing a golf swing of a golfer and outputting corresponding data; image processing means for receiving data output from the photographing means, image-processing the data and outputting corresponding image data; weight center detecting means for detecting movement of a center of weight during a golf swing and outputting a corresponding detection signal; club head detecting means for detecting an angle and a speed of a club head and outputting a corresponding detection signal; signal processing means for receiving the detection signals output from the weight center detecting means and the club head detecting means, computing the movement of the center of weight and the angle and speed of the club head within an impact zone and outputting corresponding computation data; control means for receiving the image data and the computation data output from the image processing means and the signal processing means, respectively, synchronizing the image data and the computation data and outputting moving picture data; display means situated in front of a golf ball positioned in front of the golfer for displaying a currently performed golf swing, and receiving and displaying the moving picture data output from the control means; practice center communication means for receiving and transmitting the moving picture data output from the control means, receiving and transmitting a request for provision of golf swing correcting data and a request for provision of moving pictures obtained during golf swing practice in response to a key manipulation of the golfer, and receiving and displaying golf swing correcting data and moving pictures obtained during golf swing practice; personal communication means for receiving and transmitting a request for provision of golf swing correcting data and a request for provision of moving pictures obtained during golf swing practice in response to a key manipulation of the golfer, and receiving and displaying golf swing correcting data and moving pictures obtained during golf swing practice; a Web server for receiving the request output from the practice center communication means or personal communication means, outputting a corresponding control signal, and outputting golf swing correcting data or moving picture data to the practice center communication means or personal communication means; a three-dimensional data generating server for receiving the control signal output from the Web server, generating a wire frame, that is, three-dimensional posture data of the golfer, comparing this generated wire frame with a stored reference wire frame, and outputting golf swing correcting data; a golf swing managing server for receiving the control signal output from the Web server, storing moving picture data of golf swing practice of the golfer, and outputting the stored moving picture data; and a mail server for receiving the control signal output from the Web server, and outputting various golf information to the practice center communication means or personal communication means via e-mail.

In addition, the present invention provides a method of correcting a golf swing using the Internet, comprising the steps of a Web server determining whether a golfer has accessed a home page for correcting a golf swing through practice center communication means or personal communication means; a process returning to a preceding step if the golfer has not accessed the home page, and, on the other hand, the Web server determining whether the golfer has accessed the home page through the practice center communication means if the golfer has accessed the home page; the Web server determining whether a golf practice center and the golfer are members if the golfer has accessed the home page through the practice center communication center; the Web server requesting member registration if the golf practice center and the golfer are not members at a preceding step, and, on the other hand, the Web server determining whether the golfer has requested provision of golf swing correcting data through the practice center communication means if the golf practice center and the golfer are members; the Web server determining whether the golfer has corrected his golf swing using preset reference golf swing through the practice center communication means if the golfer has requested provision of golf swing correcting data through the practice center communication means at a preceding step; the Web server receiving and transmitting moving pictures of golf swing practice through the practice center communication means and outputting a corresponding control signal if the golfer has corrected his golf swing using the preset reference golf swing at a preceding step; and a three-dimensional posture data generating server receiving the control signal output from the Web server, generating a wire frame, that is, three-dimensional posture data, comparing the generated wire frame with a stored reference wire frame, and outputting golf swing correcting data to the practice center communication means.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Embodiments of the present invention will be described in detail with reference to the attached drawings below.

Figure 1:
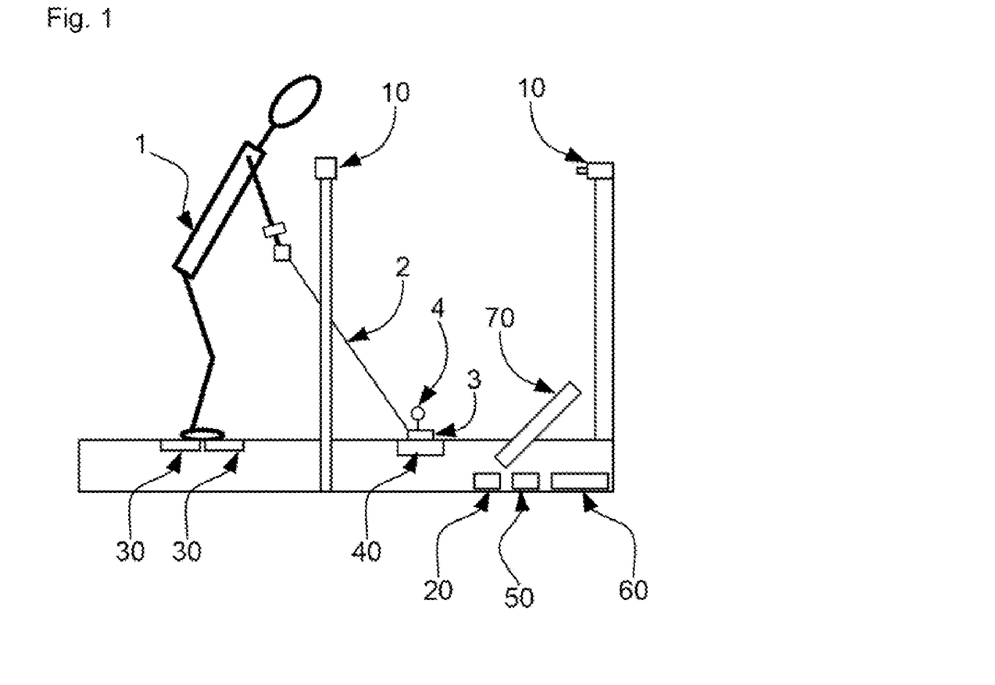
FIGS. 1 and 2 are a side view and a plan view of a golf swing correcting apparatus in accordance with an embodiment of the present invention, respectively.
Figure 2:
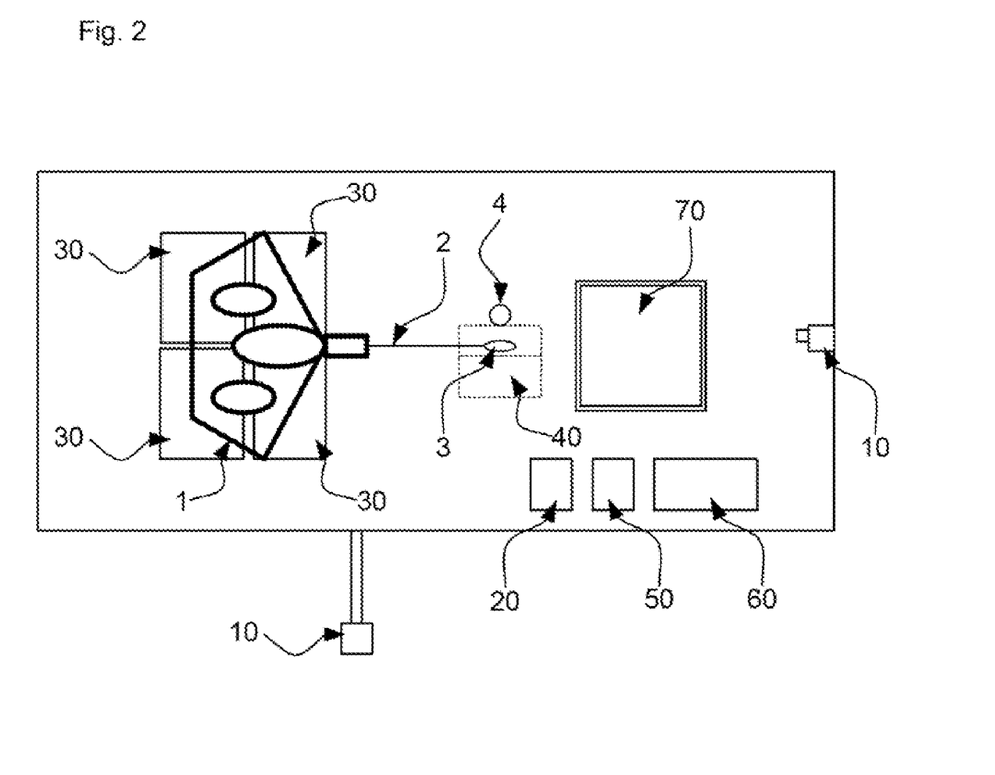
Figure 3A:
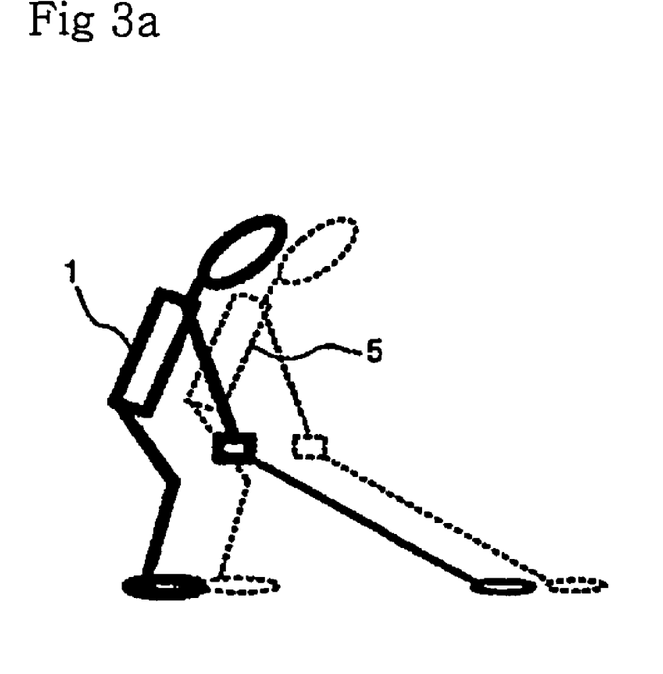
FIGS. 3a and 3b are a side view and a front view of a wire frame in accordance with an embodiment of the present invention, respectively.
Figure 3B:
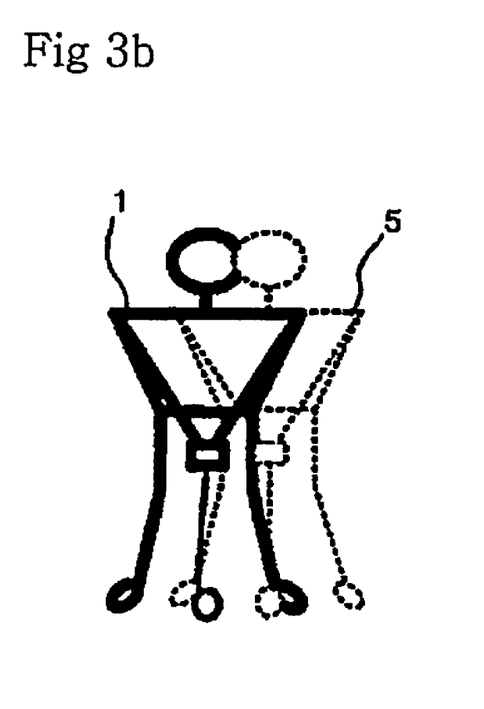
Figure 4:
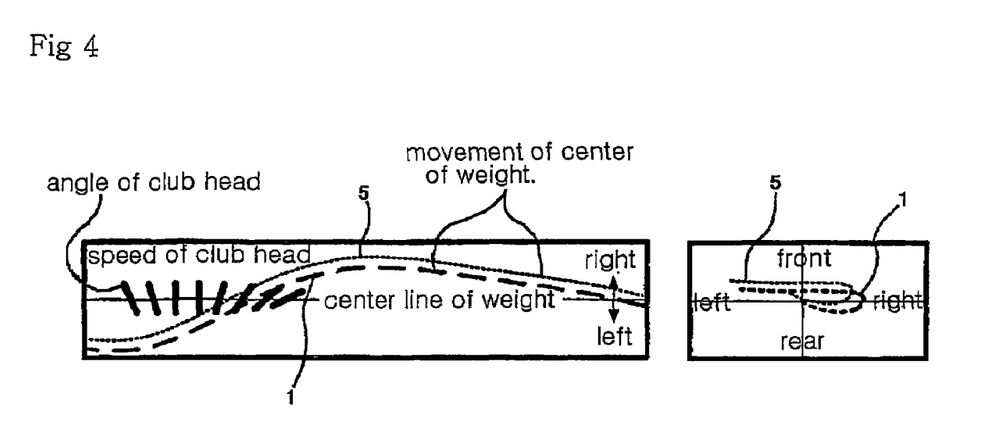
FIG. 4 is an exemplary view showing the movement of a center of weight and the angle and speed of a golf club during a golf swing.
Figure 5:
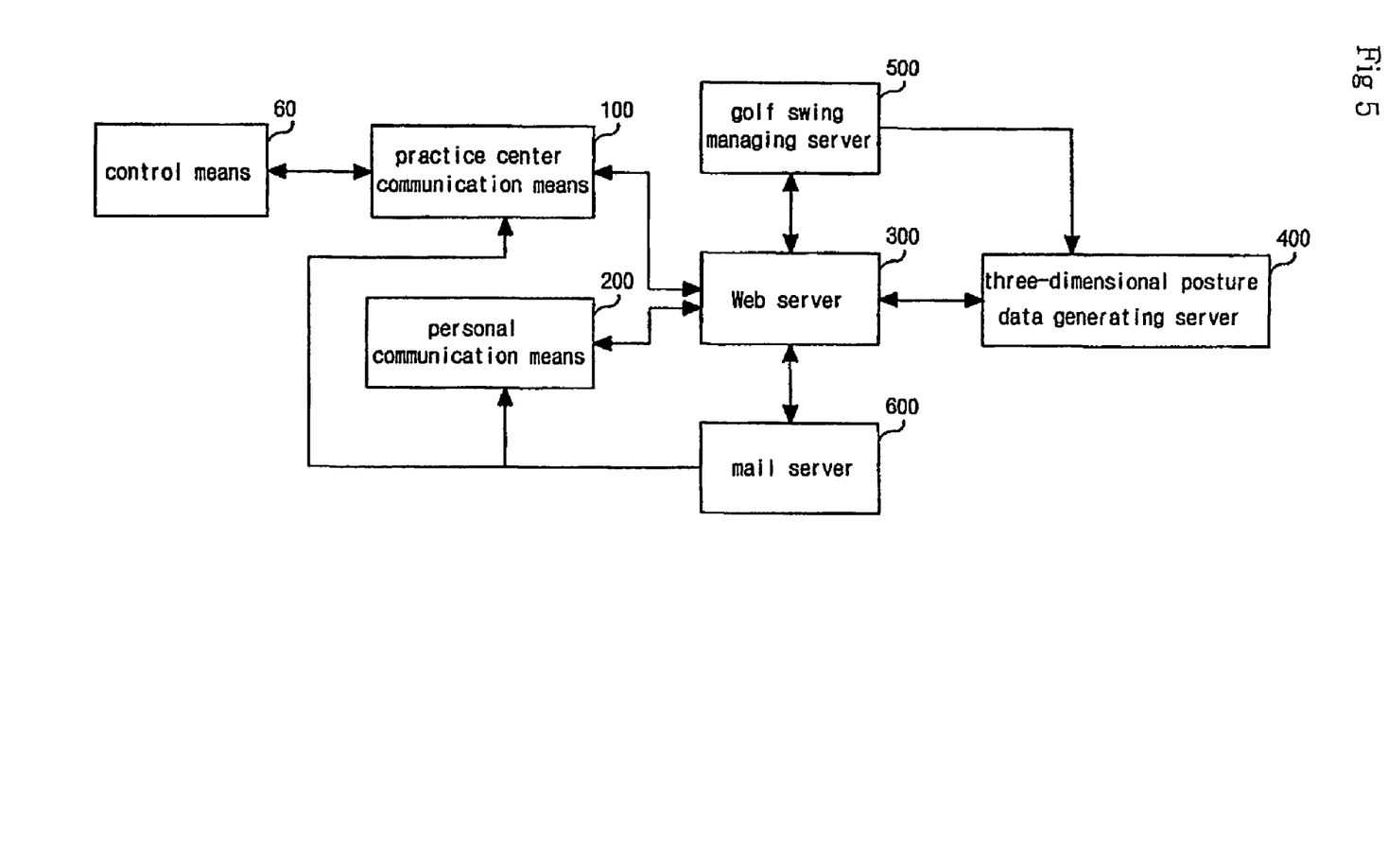
FIG. 5 is a block diagram showing a system for correcting a golf swing using the Internet in accordance with an embodiment of the present invention.
Figure 6:
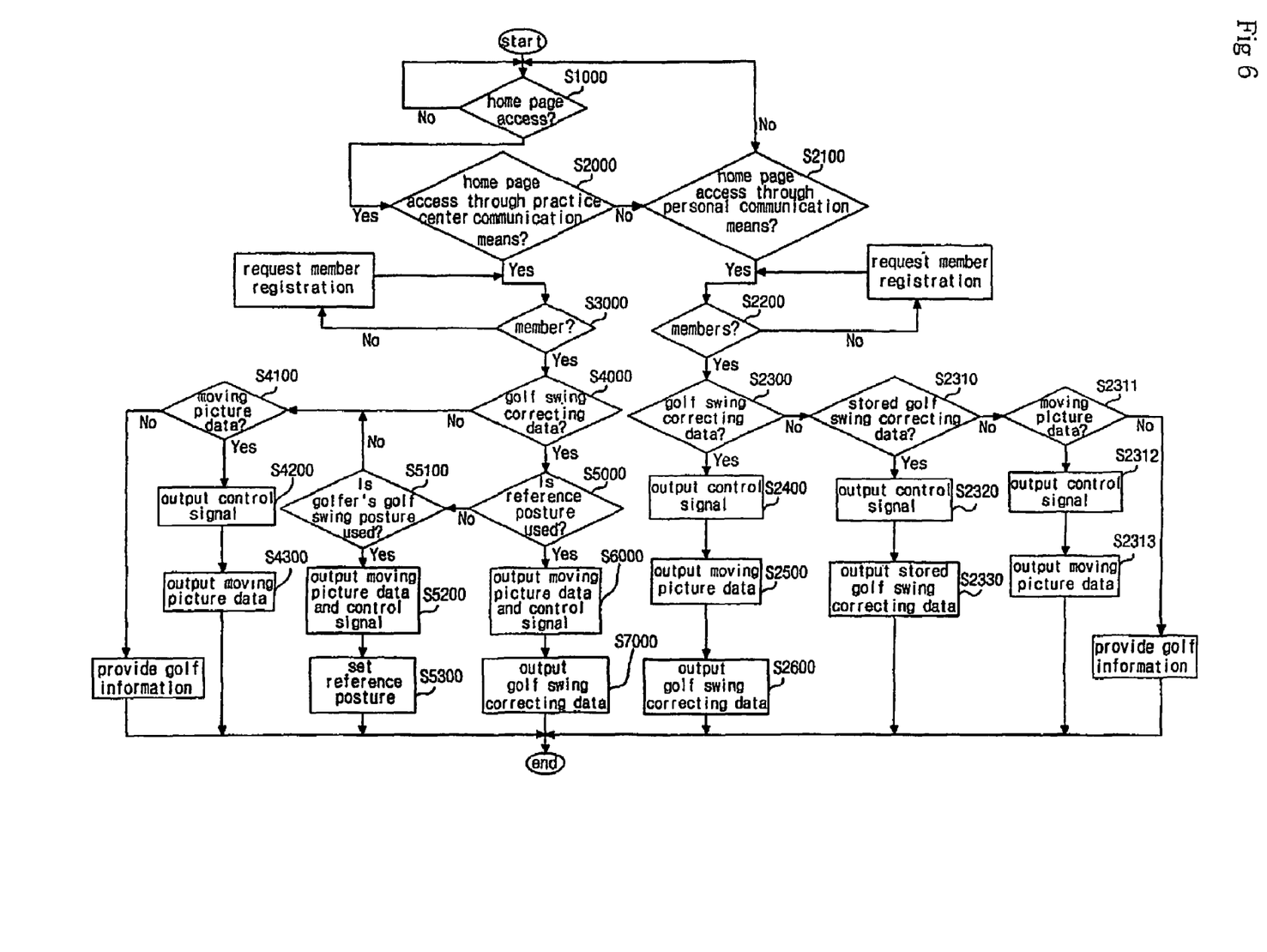
FIG. 6 is a flowchart showing a method of correcting a golf swing using the Internet in accordance with an embodiment of the present invention.
Figure 7:
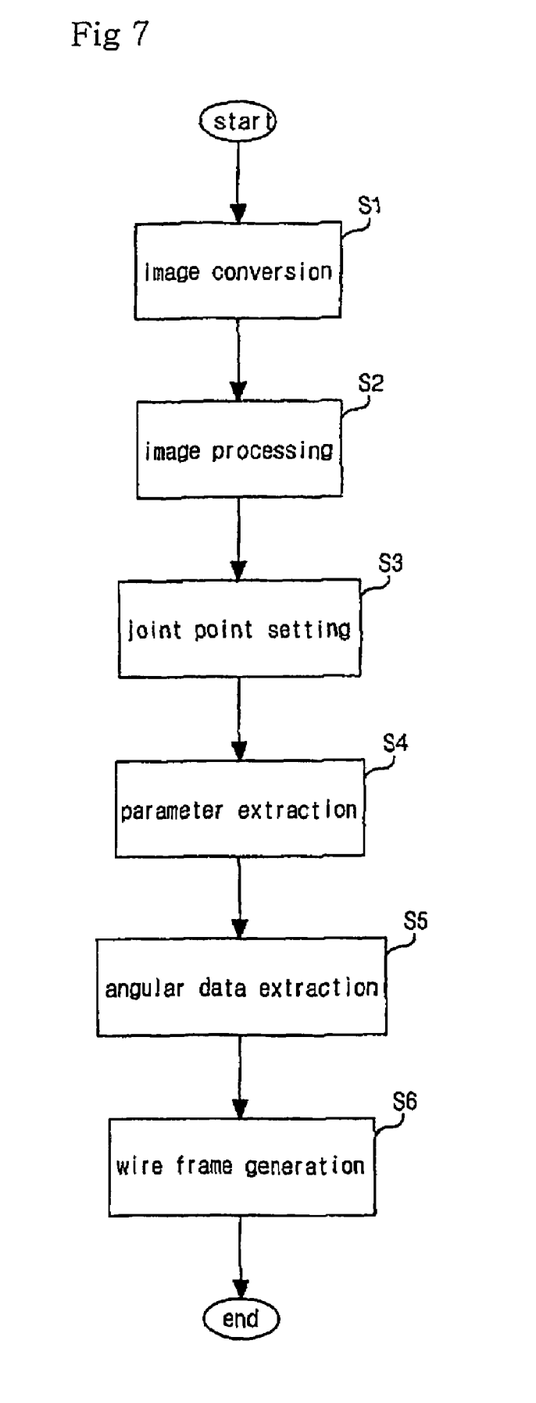
FIG. 7 is a flowchart showing a method of generating the wire frame in accordance with an embodiment of the present invention.

FIGS. 1 and 2 are a side view and a plan view of a golf swing correcting apparatus in accordance with an embodiment of the present invention, respectively. FIGS. 3a and 3b are a side view and a front view of a wire frame in accordance with an embodiment of the present invention, respectively. FIG. 4 is an exemplary view showing the movement of a center of weight and the angle and speed of a golf club during a golf swing. FIG. 5 is a block diagram showing a system for correcting a golf swing using the Internet in accordance with an embodiment of the present invention. FIG. 6 is a flowchart showing a method of correcting a golf swing using the Internet in accordance with an embodiment of the present invention. FIG. 7 is a flowchart showing a method of generating the wire frame in accordance with an embodiment of the present invention.

As illustrated in FIG. 5, the apparatus of the present invention includes a control means 60, a practice center communication means 100, a personal communication means 200, a Web server 300, a three-dimensional data generating server 400, a golf swing managing server 500 and a mail server 600.

The practice center communication means 100 receives and transmits moving picture data output from the control means 60, receives and transmits a request for the provision of golf swing correcting data and a request for the provision of moving pictures obtained during golf swing practice in response to a key manipulation of a golfer 1, and receives and displays golf swing correcting data and moving pictures obtained during golf swing practice.

The personal communication means 200 receives and transmits a request for the provision of golf swing correcting data and a request for the provision of moving pictures obtained during golf swing practice in response to a key manipulation of a golfer 1, and receives and displays golf swing correcting data and moving pictures obtained during golf swing practice.

Further, the Web server 300 receives the request output from the practice center communication means 100 or personal communication means 200, outputs a corresponding control signal, and outputs golf swing correcting data or moving picture data to the practice center communication means 100 or personal communication means 200.

The three-dimensional data generating server 400 receives the control signal output from the Web server 300, generates a wire frame, that is, three-dimensional posture data of a golfer, compares this generated wire frame with a stored reference wire frame, and outputs golf swing correcting data.

The golf swing managing server 500 receives the control signal from the Web server 300, stores moving picture data of the swing posture of the golfer 1, and outputs stored moving picture data. The mail server 600 receives the control signal from the Web server 300, and outputs various golf information to the training center communication means 100 or personal communication means 200 via e-mail.

An operation of the apparatus for correcting a golf swing via the Internet constructed as described above is described below.

Golfers usually practice golf at indoor and outdoor golf practice centers before playing golf in golf courses. In this case, apparatuses for correcting a golf swing are installed at the golf practice centers so as to correct the swing posture of golfers.

That is, as illustrated in FIGS. 1 and 2, in such a golf swing correcting apparatus, a photographing means 10 photographs a golf swing of a golfer 1 and outputs corresponding data. An image processing means 20 receives data output from the photographing means 10, image-processes the data and outputs corresponding image data.

Additionally, a weight center detecting means 30 detects the movement of the center of weight when the golfer 1 swings a golf club, and outputs a corresponding detection signal. A club head detecting means 40 detects the angle and speed of a club head 3 and outputs a corresponding detection signal.

Then, a signal processing means 50 receives the detection signals output from the weight center detecting means 30 and the club head detecting means 40, computes the movement of the center of weight and the angle and speed of the club head within an impact zone as shown in FIG. 3, and outputs corresponding computation data.

Subsequently, the control means 60 receives the image data and the computation data output from the image processing means 20 and the signal processing means 50, respectively, synchronizes the image data and the computation data, and outputs moving picture data.

In this case, a display means 70 is situated in front of a golf ball positioned in front of the golfer 1, displays a current golf swing of the golfer 1, and receives and displays moving picture data output from the control means 60 so that the golfer 1 can correct his golf swing by viewing moving pictures obtained during golf swing practice.

Meanwhile, when the golfer 1 performs a key manipulation to correct his swing posture after accessing the Internet through the practice center communication means 100 as shown in FIG. 5 so as to correct his golf swing accurately, the practice center communication means 100 outputs moving picture data input from the control means 60 and data in response to a request for the correction of swing posture.

Then, the Web server 300 receives data output from the practice center communication means 100 and outputs a corresponding control signal, and the three-dimensional posture data generating server 400 receives the control signal output from the Web server 300, generates a wire frame, that is, three-dimensional posture data, using the moving picture image of the golfer 1, compares the generated wire frame with a reference wire frame, and outputs corresponding correction data as shown in FIG. 3.

At this time, moving picture is displayed through the use of the wire frame as shown in FIG. 3, and at the same time the movement of the center of weight and the angle and speed of the club head are displayed as shown in FIG. 4.

Subsequently, the practice center communication means 100 receives golf swing correcting data input from the three-dimensional posture data generating server 40 and displays the golf swing correcting data to allow the golfer 1 to correct his swing posture.

When the golfer 1 desires to be provided with the moving picture for a certain period of time at a golf practice center, the golfer 1 causes the practice center communication means 100 to output data that requests the provision of the moving picture, and the Web server 300 receives data output from the practice center communication means 100 and outputs a corresponding control signal.

In that case, the golf swing managing server 500 stores the swing postures of the golfer 1 obtained during practice for the certain period of time in a moving picture form in advance, and can display stored moving picture data through the practice center communication means 100 in response to the data output from the Web server 300.

Meanwhile, when the golfer 1 desires to view moving pictures obtained during golf swing practice at a golf practice center, or golf swing correcting data at his home or office, he performs a key manipulation using the personal communication means 200 (for example, a work station, a personal computer, a notebook, etc.) provided at his home or office.

In that case, the personal communication means 200 outputs, for example, a request for the correction of his swing posture in response to the key manipulation of the golfer 1, the Web server 300 outputs a control signal corresponding to the request received from the personal communication means 200, and the golf swing managing server 500 outputs stored moving picture data in response to the control signal output from the Web server 300.

Subsequently, the three-dimensional posture data generating server 400 receives the moving picture data output from the golf swing managing server 500, generates a wire frame, that is, the three-dimensional posture data of the golfer 1, compares this wire frame with a stored reference wire frame, and outputs a corresponding golf swing correcting data.

Thereafter, the personal communication means 200 receives the golf swing correction data output from the three-dimensional posture data generating server 400 and displays the golf swing correction data to enable the golfer 1 to view the data.

In addition, when the golfer 1 desires to view moving pictures obtained during golf swing practice for a certain period of time at his home or office, the personal communication means 200 outputs a request for the provision of the moving pictures in response to the key manipulation of the golfer 1, and the Web server 300 receives the request for the provision of the moving pictures from the personal communication means 200 and outputs a control signal in response to the request for the provision of the moving pictures.

In that case, the golf swing managing server 500 receives a control signal and displays stored moving pictures of golf swing practice through the personal communication means 200, so the golfer 1 can view the moving pictures obtained during the golf swing practice as well as the golf swing correcting data.

Further, when the golfer 1 runs a golf swing correcting program like the three-dimensional posture data generating server 400 using the control means 60, the golfer 1 can easily view his golf-swing correcting data at a golf practice center.

Additionally, the golfer 1 can download golf swing correcting data or moving pictures of golf swing practice to the personal communication means 200 and store them in the personal communication means 200, so he can analyze and correct his golf swing at any time and be provided with various golf information via e-mail through the mail server 600.

In the meantime, the method of correcting a golf swing via the Internet is described in more detail with reference to FIG. 6.

The Web server 300 determines whether the golfer 1 accesses a home page for correcting a golf swing through the practice center communication means 100 or personal communication means 200 at step S1000.

The process returns to an initial stage if the golfer 1 does not access the home page, while the Web server 300 determines whether the golfer 1 accesses the home page through the practice center communication means 100 if the golfer 1 accesses the home page at step S2000.

Subsequently, if it is determined that the golfer 1 accesses the home page through the practice center communication means 100 at step S2000, the Web server 300 determines whether a golf practice center and the golfer 1 are members at step S3000.

Thereafter, the Web server 300 requests member registration if it is determined that the golf practice center and the golfer 1 are not members at step S3000, while the Web server 300 determines whether the golfer 1 requests the provision of golf swing correcting data through the practice center communication means 100 at step S4000 if it is determined that the golf practice center and the golfer 1 are members at step S3000.

Meanwhile, the golfer 1 can register at the golf practice center as a member as the same time that the member registration is requested.

Subsequently, if it is determined that the golfer 1 requests the provision of golf swing correcting data at step 4000, the Web server 300 determines whether the golfer 1 corrects his golf swing using a reference golf swing 5 via the practice center communication means 100 at step S5000.

In that case, the golf swing of a professional golfer provided by the golf practice center can utilized as the reference golf swing 5.

Meanwhile, if it is determined that the golfer 1 has corrected his golf swing using the preset reference golf swing, the Web server 300 receives a request for the provision of moving pictures of golf swing practice through the practice center communication means 100, and outputs the moving pictures of golf swing practice and a control signal corresponding to the request for the provision of the moving pictures at step S6000.

Then, the three-dimensional posture data generating server 400 receives moving picture data from the Web server 300, generates a wire frame, that is, three-dimensional posture data, compares the wire frame with a stored reference wire frame, and outputs golf swing correcting data to the practice center communication means 100 at step S7000.

In the meantime, if it is determined that the golfer 1 does not access the home page through the practice center communication means 100 at step S2000, the Web server 300 determines whether the golfer 1 accesses the home page through the personal communication means 200 at step S2100.

In that case, the process returns to step S1000 if it is determined that the golfer 1 does not access the home page through the personal communication means 200 at step S2 100, while the Web server 300 determines whether the golfer 1 is a member S2200 if it is determined that the golfer 1 accesses the home page through the personal communication means 200 at step S2100.

The Web server 300 requests member registration if it is determined that the golfer 1 is a member at step S2200, while the Web server 300 determines whether the golfer 1 requests the provision of golf swing correcting data through the practice center communication means 100 at step 2300 if it is determined that the golfer 1 is a member at step S2200. If it is determined that the golfer 1 requests the provision of golf swing correcting data at step 2300, the Web server 300 outputs a corresponding control signal at step S2400.

Then, the golf swing managing server 500 receives the control signal from the Web server 300, and outputs stored moving pictures of golf swing practice at step S2500.

Subsequently, the three-dimensional posture data generating server 400 receives the control signal from the Web server 300, generates a wire frame, that is, three-dimensional posture data, compares this wire frame with a stored reference wire frame, and outputs golf swing correcting data to the personal communication means 200 at step S2600.

In the meantime, if it is determined that the golfer 1 has not requested the provision of golf swing correcting data at step 4000, the Web server 300 determines whether the golfer 1 has requested the provision of moving pictures of golf swing practice at step S4100.

In that case, the Web server 300 allows the mail server 600 to provide golf information to the golfer 1 if it is determined that the golfer 1 has not requested the provision of moving pictures of golf swing practice at step S4100, while the Web server 300 outputs a corresponding control signal at step S4200 if it is determined that the golfer 1 has requested the provision of moving pictures of golf swing practice at step S4100.

Thereafter, the golf swing managing server 500 receives the control signal from the Web server 300, and outputs moving pictures of golf swing practice to the practice center communication means 100 at step S4300.

If it is determined that the golfer 1 has not corrected his golf swing using a reference golf swing at step S5000, the Web server 300 determines whether the golfer has set the reference golf swing 5 to his golf swing at step S5100.

Thereafter, the process returns to step S4100 if it is determined that the golfer 1 has not set the reference golf swing 5 to his golf swing at step S5100, while the Web server 300 outputs a corresponding control signal as well as moving picture data input through the practice center communication means 100 at step S5200 if it is determined that the golfer 1 has not set the reference golf swing 5 to his golf swing at step S5100.

Then, the three-dimensional posture data generating server 400 receives the moving picture data and the control signal output from the Web server 300, generates a wire frame corresponding to the golf swing posture and sets the reference golf swing to the wire frame at step S5300.

In the meantime, if it is determined that the provision of golf swing correcting data has not been requested at step S2300, the Web server 300 determines whether the golfer 1 has requested the provision of stored golf swing correcting data through the personal communication means 200 at step S2310.

Subsequently, if it is determined that the golfer 1 has requested the provision of stored golf swing correcting data through the personal communication means 200 at step S2310, the Web server 300 outputs a corresponding control signal at step s2320.

In that case, the three-dimensional posture data generating server 400 receives the control signal output from the Web server 300, and outputs the stored golf swing correcting data to the personal communication means 200 at step S2330.

Further, if it is determined that the golfer 1 has not requested the provision of stored golf swing correcting data through the personal communication means 200 at step S2310, the Web server 300 determines whether the golfer 1 has requested the moving pictures of golf swing practice at step S2311.

In that case, the Web server 300 allows the mail server 600 to provide golf information to the golfer 1 if it is determined that the golfer 1 has not requested the moving pictures of golf swing practice at step S2311, while the Web server 300 outputs a corresponding control signal at step S2311 if it is determined that the golfer 1 has requested the provision of moving pictures of golf swing practice at step S4100.

Then, the golf swing managing server 500 receives the control signal from the Web server 300, and outputs the stored moving pictures of golf swing practice to the personal communication means 200 at step S2313.

Referring to FIG. 7, a method of generating a wire frame according to the golf swing posture of the golfer 1. The three-dimensional posture data generating server receives moving picture data from the practice center communication means 100 through the Web server 300 and converts each frame of the moving picture data into an image at step S1.

Subsequently, the converted images are image-processed to images of a certain size at step S2. Joint points of the golfer 1 are set using the processed images at step S3. Parameters associated with the movement of the golfer 1 are extracted using the set joint points at step S4.

Angle data of each changed joint of the golfer 1 is extracted using the parameters at step S5. A wire frame of the golfer 1 is generated using angle data corresponding to each image at step S6.

INDUSTRIAL APPLICABILITY

As described above, the present invention provides a system and method for correcting a golf swing using the Internet, which can provide moving pictures of golf swing practice and golf swing correcting data via the Internet, so a golf swing can be easily corrected at a golf practice center, home or office, various information such as an angle, traces and time of a golf swing and the movement of weight associated with a golf swing can be provided to a golfer, and moving pictures and data provided can be stored and analyzed at any time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for correcting a golf swing using the Internet, comprising:

photographing means for photographing a golf swing of a golfer and outputting corresponding data;

image processing means for receiving data output from the photographing means, image-processing the data and outputting corresponding image data;

weight center detecting means for detecting movement of a center of weight during a golf swing and outputting a corresponding detection signal;

club head detecting means for detecting an angle and a speed of a club head and outputting a corresponding detection signal;

signal processing means for receiving the detection signals output from the weight center detecting means and the club head detecting means, computing the movement of the center of weight and the angle and speed of the club head within an impact zone and outputting corresponding computation data;

control means for receiving the image data and the computation data output from the image processing means and the signal processing means, respectively, synchronizing the image data and the computation data and outputting moving picture data;

display means situated in front of a golf ball positioned in front of the golfer for displaying a currently performed golf swing, and receiving and displaying the moving picture data output from the control means;

practice center communication means for receiving and transmitting the moving picture data output from the control means, receiving and transmitting a request for provision of golf swing correcting data and a request for provision of moving pictures obtained during golf swing practice in response to a key manipulation of the golfer, and receiving and displaying golf swing correcting data and moving pictures obtained during golf swing practice;

personal communication means for receiving and transmitting a request for provision of golf swing correcting data and a request for provision of moving pictures obtained during golf swing practice in response to a key manipulation of the golfer, and receiving and displaying golf swing correcting data and moving pictures obtained during golf swing practice;

a Web server for receiving the request output from the practice center communication means or personal communication means, outputting a corresponding control signal, and outputting golf swing correcting data or moving picture data to the practice center communication means or personal communication means;

a three-dimensional data generating server for receiving the control signal output from the Web server, generating a wire frame, that is, three-dimensional posture data of the golfer, comparing this generated wire frame with a stored reference wire frame, and outputting golf swing correcting data, wherein generating the wire frame includes:

a three-dimensional posture data generating server receiving moving picture data from practice center communication means through the Web server and converting each frame of the moving picture data into an image, image-processing the converted images to images of certain size, converting each frame of the moving picture data into an image, image-processing the converted images to images of a certain size, setting joint points of a golfer using the processed images, extracting parameters associated with movement of the golfer using the set joint points, extracting angle data of each changed joint of the golfer using the parameters, and generating the wire frame of the golfer using angle data corresponding to each image;

a golf swing managing server for receiving the control signal output from the Web server, storing moving picture data of golf swing practice of the golfer, and outputting the stored moving picture data; and a mail server for receiving the control signal output from the Web server, and outputting various golf information to the practice center communication means or personal communication means via e-mail.

2. The system as set forth in claim 1, wherein the control means allows a golf swing correcting program to be installed so that the golfer can correct his golf swing using a wire frame at a golf practice center.

3. A method of correcting a golf swing using the Internet, comprising the steps of:

a Web server determining whether a golfer has accessed a home page for correcting a golf swing through practice center communication means or personal communication means;

a process returning to a preceding step if the golfer has not accessed the home page, and, on the other hand, the Web server determining whether the golfer has accessed the home page through the practice center communication means if the golfer has accessed the home page;

the Web server determining whether a golf practice center and the golfer are members if the golfer has accessed the home page through the practice center communication center;

the Web server requesting member registration if the golf practice center and the golfer are not members at a preceding step, and, on the other hand, the Web server determining whether the golfer has requested provision of golf swing correcting data through the practice center communication means if the golf practice center and the golfer are members;

the Web server determining whether the golfer has corrected his golf swing using preset reference golf swing through the practice center communication means if the golfer has requested provision of golf swing correcting data through the practice center communication means at a preceding step;

the Web server receiving and transmitting moving pictures of golf swing practice through the practice center communication means and outputting a corresponding control signal if the golfer has corrected his golf swing using the preset reference golf swing at a preceding step; and a three-dimensional posture data generating server receiving the control signal output from the Web server, generating a wire frame, that is, three-dimensional posture data, comparing the generated wire frame with a stored reference wire frame, and outputting golf swing correcting data to the practice center communication means, wherein generating the wire frame includes:

a three-dimensional posture data generating server receiving moving picture data from practice center communication means through a Web server and converting each frame of the moving picture data into an image, image-processing the converted images to images of certain size, converting each frame of the moving picture data into an image.

image-processing the converted images to images of a certain size, setting ioint points of a aolfer using the processed images, extracting parameters associated with movement of the golfer using the set ioint points, extracting angle data of each changed ioint of the golfer using the parameters, and generating the wire frame of the aolfer using angle data corresponding to each image.

4. The method as set forth in claim 3, further comprising the steps of:

the Web server determining whether the golfer has accessed the home page through the personal communication means if the golfer has not accessed the home page through the practice center communication means;

the process returning to the step of a Web server determining whether a golfer has accessed a home page for correcting the golf swing through the practice center communication means or personal communication means if the golfer has not accessed the home page through the personal communication means, and, on the other hand, the Web server determining whether the golfer is a member if the golfer has accessed the home page through the personal communication means;

the Web server requesting member registration if the golfer is not a member at a preceding step, and, on the other hand, the Web server determining whether the golfer has requested provision of golf swing correcting data through the personal communication means if the golfer is a member at the preceding step;

the Web server outputting a corresponding control signal if the golfer has requested the provision of golf swing correcting data at a preceding step;

the golf swing managing server receiving the control signal output from the Web server, and transmitting stored moving picture data of golf swing practice of the golfer; and the three-dimensional posture data generating server receiving the control signal output from the Web server, generating a wire frame, that is, three-dimensional posture data of the golfer, using the moving picture data transmitted from the golf swing managing server, comparing the generated wire frame with a stored reference wire frame, and outputting golf swing correcting data to the personal communication means.

5. The method as set forth in claim 3, further comprising the steps of:

the Web server determining whether the golfer has requested provision of moving pictures of his golf swing practice if the golfer has not requested the provision of the golf swing correcting data at the step of the Web server determining whether the golfer has requested the provision of golf swing correcting data first;

the Web server providing general golf information via a mail server if the golfer has not requested the moving pictures of his golf swing practice at a preceding step, and, on the other hand, the Web server outputting a corresponding control signal if the golfer has requested the moving pictures of his golf swing practice at the preceding step; and the golf swing managing server receiving the control signal output from the Web server, and outputting stored moving pictures of golf swing practice of the golfer to the practice center communication means.

6. The method as set forth in claim 3, further comprising the steps of:

the Web determining whether the golfer has set a reference posture to his golf swing posture through the practice center communication means if the golfer has not corrected his golf swing using a preset golf swing;

the process returning to the step of the Web server determining whether the golfer has requested the moving pictures of golf swing practice if the golfer has not set a reference posture to his golf swing posture through the practice center communication means, and, on the other hand, the Web server transmitting moving picture data input from the practice center communication means and outputting a corresponding control signal if the golfer has set a reference posture to his golf swing posture through the practice center communication means; and the three-dimensional posture data generating server receiving the moving picture data and the control signal output from the Web server, generating a wire frame corresponding to golf swing posture of the golfer, and setting the reference golf swing posture to the generated wire frame.

7. The method as set forth in claim 4, further comprising the steps of:

the Web server determining whether the golfer has requested provision of stored golf swing correcting data if the golfer has not requested the provision of golf swing correcting data at the step of the Web server determining whether the golfer has requested the provision of golf swing correcting data second;

the Web server outputting a corresponding control signal if the golfer has requested the stored golf swing correcting data; and the three-dimensional posture generating server receiving the control signal output from the Web server and outputting the stored golf swing correcting data to the personal communication means.

8. The method as set forth in claim 7, further comprising the steps of:
- the Web server determining whether the golfer has requested provision of moving pictures of his golf swing practice through the personal communication means if the golfer has not requested the stored golf swing correcting data;
- the Web server providing general golf information if the golfer has not requested provision of moving pictures of his golf swing practice through the personal communication manes, and, on the other hand, the Web server outputting a corresponding control signal if the golfer has requested provision of moving pictures of his golf swing practice through the personal communication means; and
- the golf swing managing server receiving the control signal output from the Web server and outputting stored moving pictures of golf swing practice to the personal communication means.

* * * * *